US006909396B2

(12) United States Patent
Haselsteiner et al.

(10) Patent No.: US 6,909,396 B2
(45) Date of Patent: Jun. 21, 2005

(54) METHOD AND DEVICE FOR DETERMINING THE POSITION OF AT LEAST ONE SECOND TRANSMITTING AND RECEIVING DEVICE IN RESPECT OF A FIRST TRANSMITTING AND RECEIVING DEVICE IN A PASSIVE ACCESS CONTROL SYSTEM OPERATING IN THE GHZ RANGE

(75) Inventors: Mario Haselsteiner, Haibühl (DE); Klaus Hofbeck, Neumarkt (DE); Thomas Klement, Regensburg (DE); Birgit Rösel, Regensburg (DE); Arnd Stielow, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/689,880

(22) Filed: Oct. 21, 2003

(65) Prior Publication Data

US 2004/0125013 A1 Jul. 1, 2004

(30) Foreign Application Priority Data

Oct. 25, 2002 (DE) .......................................... 102 49 866

(51) Int. Cl.[7] .............................................. G01S 13/84
(52) U.S. Cl. ...................... 342/61; 342/125; 342/127; 342/134; 342/148; 340/5.2; 340/5.31; 340/5.72
(58) Field of Search ............................... 342/61, 69, 70, 342/72, 90, 93, 124–128, 134, 135, 148, 193, 195; 340/5.2, 5.3, 5.31, 5.72, 5.8

(56) References Cited

U.S. PATENT DOCUMENTS

| 4,282,524 | A | * | 8/1981 | Eymann et al. .............. 342/122 |
| 4,435,709 | A | * | 3/1984 | Kipp ........................... 342/101 |
| 4,646,092 | A | * | 2/1987 | Schreuder ................... 342/125 |
| 5,381,444 | A | * | 1/1995 | Tajima ........................ 375/141 |
| 5,481,504 | A | * | 1/1996 | Rosenbach et al. ......... 367/101 |
| 5,914,683 | A | * | 6/1999 | O'Conner .................... 342/127 |
| 6,429,804 | B1 | * | 8/2002 | Kishida et al. ............... 342/70 |
| 6,798,339 | B2 | * | 9/2004 | Thompson ............. 340/426.28 |
| 6,809,629 | B2 | * | 10/2004 | Heide et al. ................ 340/5.61 |
| 6,812,823 | B2 | * | 11/2004 | Inaba et al. .................. 340/5.6 |
| 6,838,976 | B2 | * | 1/2005 | Mindl et al. ............... 340/5.72 |
| 2004/0125013 | A1 | * | 7/2004 | Haselsteiner et al. ....... 342/125 |

* cited by examiner

Primary Examiner—John B. Sotomayor
(74) Attorney, Agent, or Firm—Baker Botts L.L.P.

(57) ABSTRACT

A method for determining the position of at least one second transmitting and receiving device (3) in respect of a first transmitting and receiving device in a passive access control system operating in the GHz range, comprising the steps of using a radar method, wherein signals (f1, f2) are received in the first transmitting and receiving device on the left-hand side and right-hand side of a modulation frequency ($f_{mod}$), determining the distance of two signals (f1, f2) closest to the left-hand side and right-hand side modulation frequency ($f_{mod}$) wherein the distance is proportional to the distance between the first transmitting and receiving device and at least one second transmitting and receiving device (3), so that multipath propagations are not taken into consideration.

10 Claims, 2 Drawing Sheets

METHOD AND DEVICE FOR DETERMINING THE POSITION OF AT LEAST ONE SECOND TRANSMITTING AND RECEIVING DEVICE IN RESPECT OF A FIRST TRANSMITTING AND RECEIVING DEVICE IN A PASSIVE ACCESS CONTROL SYSTEM OPERATING IN THE GHZ RANGE

PRIORITY

This application claims foreign priority of the German application DE 10249866.0 filed on Oct. 25, 2002.

BACKGROUND OF THE INVENTION

Such methods and devices are used, for example, in automotive engineering so that when an operator approaches or moves away, corresponding actions such as locking/unlocking the central locking, locking/unlocking the immobilizer, controlling the interior lighting, closing/opening the electrically controlled side window, etc. can automatically be carried out.

In order to allow increased operating convenience, a so-called zone model is proposed in DE 100 64 141 A1 so that when an operator approaches, a corresponding action is carried out depending on the distance to the vehicle or his presence within a specific zone.

Signal transmission methods that operate specifically within the microwave range, i.e. in the GHz range, could produce incorrect position finding because of multiple reflected signals—the so-called multipath propagation problem.

For example, signals of the ID transmitter reach the vehicle reflected from a wall instead of along the direct path. Incorrect signals or several signals of an ID transmitter are received accordingly from a vehicle or a base station in the vehicle. This makes it difficult or even impossible to determine a position unambiguously and correctly.

In the most unfavorable cases, such as a (screened off) ID transmitter covered by the operator's body in the (direct) direction of the vehicle, the signal reflected from a wall then leads to a stronger signal received from the base station, so that even any conceivable difference in the signals regarding their power or amplitude does not reliably determine the position of an ID transmitter.

SUMMARY OF THE INVENTION

The object of the present invention therefore is to create a method as well as a device for carrying out such a method that allows a reliable position determination of at least one second transmitting and receiving device in respect of a first transmitting and receiving device in a passive access control system operating in the GHz range and also in the case of multipath propagations of the signals.

This object can be achieved by a method for determining the position of at least one second transmitting and receiving device in respect of a first transmitting and receiving device in a passive access control system operating in the GHz range, comprising the steps of:

a) using a radar method, particularly an FM-CW radar method, by which signals are received in the first transmitting and receiving device on the left-hand side and right-hand side of a modulation frequency, b) determining the distance of two signals closest to the left-hand side and right-hand side modulation frequency, wherein the distance of the two signals is proportional to the distance between the first transmitting and receiving device and at least the second transmitting and receiving device so that multipath propagations are not taken into consideration.

The distance of the signals can be determined by means of at least one bandpass filter wherein in a first measurement, starting out with a predefined lowest bandwidth and if signals are not detected within this bandwidth, the distance of the bottom and top limits of at least one bandpass filter is increased by the modulation frequency for the next measurement. Each subsequent measurement may take place with a predefined bandwidth in each case. Different ranges can be assigned to different top and bottom measurements.

The object can also be achieved by a transmitting and receiving device for determining the position of at least one further transmitting and receiving device, wherein the transmitting and receiving device is embodied as an FM-CW radar transmitting and receiving device and comprises at least one bandpass filter to determine the distance of two signals lying closest to the left-hand side and right-hand side of the modulation frequency.

The at least one bandpass filter can be varied to perform consecutive measurements with different increasing bandwidths in each case. The transmitting and receiving device may have two bandpass filters to detect signals lying on the left-hand side and right-hand side of the modulation frequency, respectively.

The object can also be achieved by an arrangement comprising a first transmitting and receiving device, and a second transmitting and receiving device, wherein the first transmitting and receiving device can determine the position of the at least second transmitting and receiving device, the first transmitting and receiving device is embodied as an FM-CW radar transmitting and receiving device and comprises at least one bandpass filter to determine the distance of two signals lying closest to the left-hand side and right-hand side of the modulation frequency, the first transmitting and receiving device is embodied as the base station of a vehicle, and wherein the at least second transmitting and receiving device as an ID transmitter.

The second transmitting and receiving device can be embodied as a reflector that returns the signals of the first transmitting and receiving device in a modulated way. The at least one bandpass filter can be varied to perform consecutive measurements with different increasing bandwidths in each case. The first transmitting and receiving device may have two bandpass filters to detect signals lying on the left-hand side and right-hand side of the modulation frequency, respectively.

Use of the FM-CW radar method produces resolvable signals that differ from the modulation frequency by several hundred hertz on the right-hand side and left-hand side of the modulation frequency in the kHz range, for example 100 kHz, in the IF range in spectral lines (for example, by means of bandpass filters or the calculation such as fast fourier transformation, FFT) because of the increasing frequency, the delayed reception and mixing with the original frequency in the receiving first transmitting and receiving device after repeated modulation and demodulation.

By determining the distance of the left-sided and right-sided spectral lines closest to the modulation frequency or the frequencies of the (return) signals, the distance between the first and second transmitting and receiving device can be determined in a simple way because these distances are proportional to one another.

Since, according to the invention, the spectral lines closest to the modulation frequency or the signal (frequency) are detected for a distance measurement, faults or incorrect measurements because of multipath propagations can reliably be prevented in a simple way because only the closest spectral lines can originate from the direct signals.

Here signals or their resolved spectral lines are further from the modulation frequency because of multiple reflected signals and are accordingly not considered in the (remote) position determination of the ID transmitter according to the invention even if they are received more strongly in power and amplitude because of the screening of the more direct signal.

Such signals or spectral lines can, for example, be detected by means of a bandpass filter in which case in a first measurement, one starts out with a predefined lowest or smallest bandwidth that only detects the spectral lines or frequencies of return signals within a specific range around the first transmitting and receiving device.

Should there be no detection of signals or resolution in spectral lines within this bandwidth or this zone, the bottom and top limit of at least one bandpass (left-hand side and right-hand side of the modulation frequency, especially symmetrical to it) can be increased for a next measurement so that further spaced apart signals or their spectral lines and therefore transmitting and receiving devices that are further away can also be detected.

Via corresponding predefined stages or bandwidths to which the corresponding ranges or the outer zone borders are assigned, a position of a second transmitting and receiving device particularly an ID transmitter can be determined advantageously in a simple way even within different zones.

In a preferred embodiment of the invention, the first transmitting and receiving device is designed as the base station of a vehicle and the second transmitting and receiving device at least as an ID transmitter, for example, as (active) reflector, that is usually carried by an operator on their body, in their clothing, on a bunch of keys, etc. and reflects the signal in a modulated way (for example, the backscatter cross-section).

BRIEF DESCRIPTION OF THE DRAWINGS

The invention is explained in greater detail below based on the forms of embodiment shown in the drawing.

The drawings show.

DETAILED DESCRIPTION OF THE PREFERRED EMBODIMENTS

Figure 1:
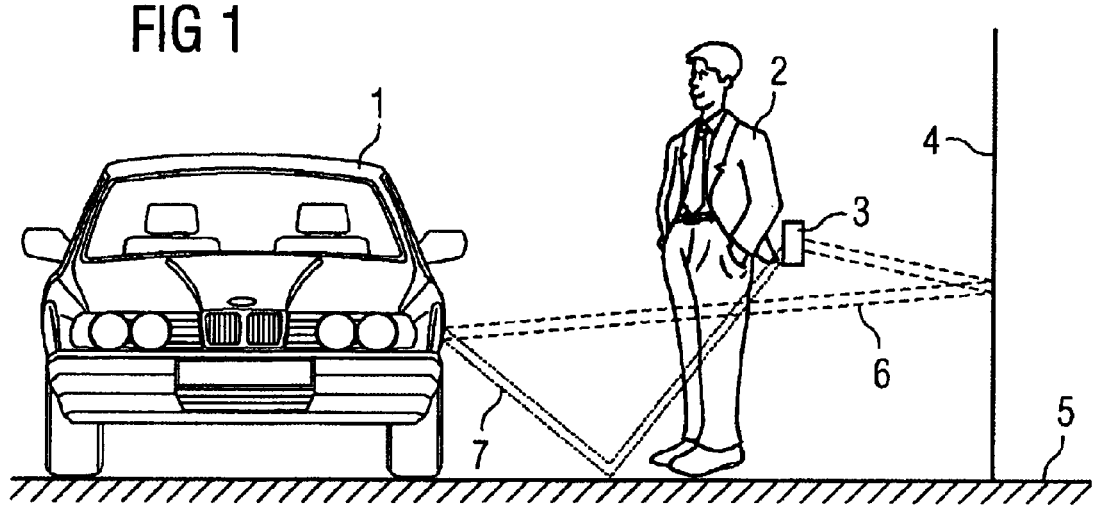
FIG. 1 a schematic representation of a person approaching a vehicle.

FIG. 1 shows how an operator 2, for example a driver, approaches vehicle 1 in a normal way and as a result the problem of multipath propagation of the signals or return signals of an ID transmitter 3 to vehicle 1 or a base station inside it to receive these signals can occur.

Should the direct path to the vehicle 1 or the base station for communication between the ID transmitter 3 and the base station in vehicle 1 be screened, i.e. for example, ID transmitter 3 at the back of operator 2 who approaches vehicle 1 in a forward direction, only limited communication takes place or, as shown in FIG. 1, no longer on the direct path, but via reflected waves. Despite a longer propagation path 6, strong reflections can happen, for example, from a back wall 4 and these reflections may cover the weaker signals, for example, via path 7, despite a shorter propagation path (for example, reflected via the floor 5).

Correspondingly, for conventional methods, the stronger signal based on the longer propagation path 6 would lead to incorrect results when determining the position of the ID transmitter 3 (calculated distances too great).

Naturally, FIG. 1 only shows a case of waves originating because of multipath propagation so that many possibilities of the overlapping of signals may result in spite of a longer propagation path compared to signals with a shorter propagation path up to the ideal direct signals.

Figure 2:
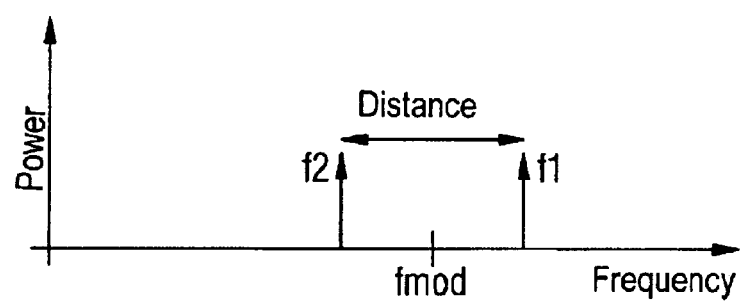
FIG. 2 a diagram of a power spectrum in the IF range of the received (return) signals without interference.

FIG. 2 shows the way in which a distance measurement arises without multipath propagation or interference by reflections according to the FM-CW radar method in the received first transmitting and receiving device, therefore, in this case the base station of vehicle 1, as the power spectrum in the IF range.

This type of radar method, in which the ID transmitter 3, for example, modulates, reflects or returns the signals of the base station, particularly the return backscatter cross-section, is known in the prior art and is not explained in greater detail.

In the case of this well-known method, after several modulation and demodulation processes, receiving signals are produced in the power spectrum that lie just below or above, i.e. in the diagram according to FIG. 2, on the left-hand side and right-hand side of the modulation frequency $f_{mod}$ of, for example, 100 kHz, in which case modulation frequency $f_{mod}$ is many times greater than the displacement frequency of signals f1, f2.

The frequencies of the demodulated received signals f1, f2 or their resolved spectral lines lie close together, for example, up to several hundred hertz at the modulation frequency $f_{mod}$ ($f_{mod} >> $ f1, f2).

In this case, the spacing of signals f1, f2 or their spectral lines is proportional to the distance between the ID transmitter 3 and the base station in vehicle 1 so that if there is no interference and multipath propagation, the distance between the ID transmitter 3 and vehicle 1 can be determined from this.

Figure 3:
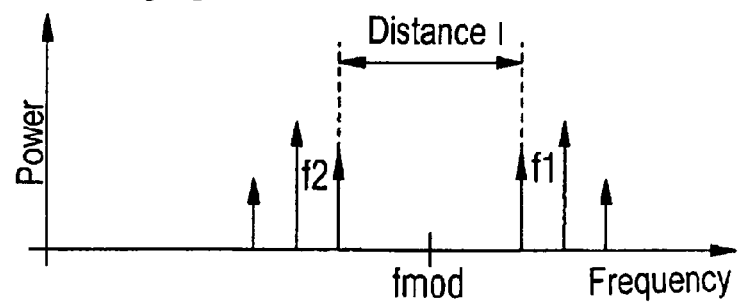
FIG. 3 a diagram of a power spectrum in the IF range of the received (return) signals with interference via multipath propagation.

By contrast, FIG. 3 shows a power spectrum with interferences via reflected signals or multipath propagation so that in the base station on the left-hand side and right-hand side of the modulation frequency, for example, three signals or their spectral lines arise with different power, amplitude and frequency. In this case, it may also happen, as shown, that the signals or the spectral lines of the shortest or even direct signal paths have less power or a smaller amplitude than signals with a longer propagation path (see, for example, middle spectral line).

These middle signals on the right-hand side and left-hand side or their spectral lines could, for example, stand for the propagation path 6 in FIG. 1 that in its direction is indeed more direct between the vehicle and the ID transmitter, however, strongly reflected from the back wall.

Figure 4:
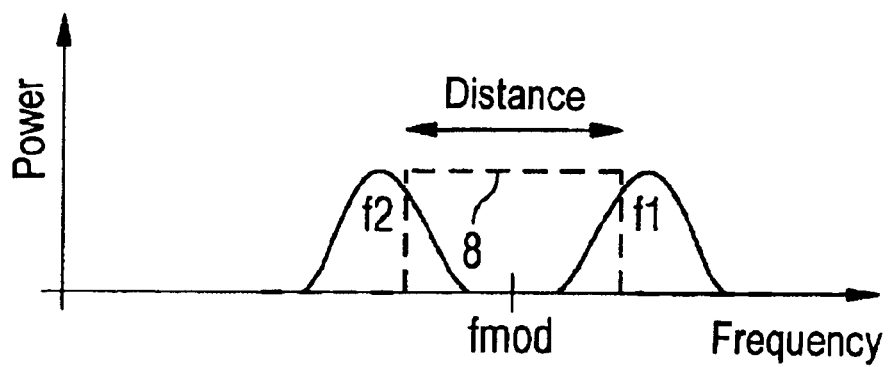
FIG. 4 a diagram of a first form of embodiment of the invention with a band-pass filter and FIG. 5 a diagram of a second form of embodiment of the invention with two bandpass filters.

According to the invention the fact that the correct signals of one and the same ID transmitter 3 lie closer to the modulation frequency than signals with a longer propagation path is taken into consideration and is used, for example, in a first embodiment for implementing the method according to the invention as shown in the diagram according to FIG. 4 for determining the position of the ID transmitter 3.

As can be seen in FIG. 4, a filter, for example, a bandpass 8 with a predefined bandwidth shown with a broken line, is used to only take account of frequencies that are within a specific distance of the modulation frequency $f_{mod}$. If there are, on the left-hand side and right-hand side of the modulation frequency in the range of this bandpass, preferably symmetrically around the modulation frequency, signals with detectable power intensity or if they can be resolved into spectral lines, it can be concluded that ID transmitter 3 is within a range around the vehicle 1 or the base station inside it with outside limits that correspond to the bottom and top frequency of the bandpass.

Figure 5:
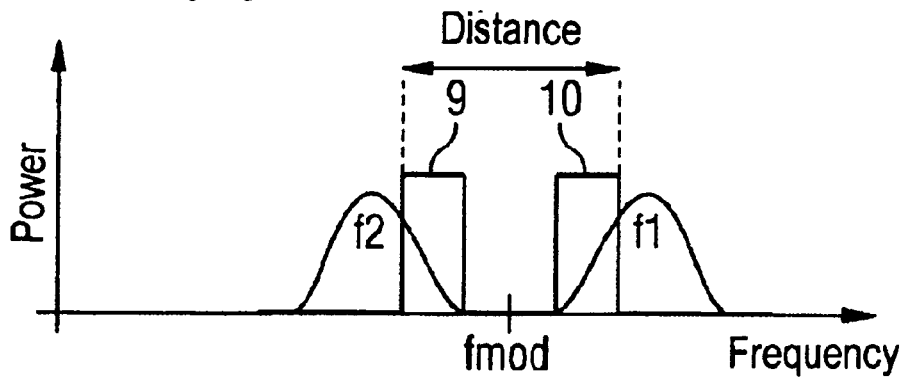

FIG. 5 shows a further embodiment for implementing the method according to the invention, in which case preferably two bandpass filters 9 and 10 lying symmetrically on the left-hand side and right-hand side of the modulation frequency $f_{mod}$ instead of one bandpass filter, are used as filter. As a result, the noise bandwidth is advantageously reduced further compared to implementation with only one bandpass 8.

The method according to the invention, particularly its application in the zone model, is explained below. Here, a first measurement with a predefined adjustable lowest or smallest bandwidth of bandpass 8 measures whether or not there is an ID transmitter in this range or whether signals with corresponding power can be detected. In the case of successful receipt, signals are faded out via multipath propagation even when they are stronger.

If there is no ID transmitter 3 within this range, the bandwidth of bandpass 8 can be increased by a predefined value each time in which case the bottom and top frequency of the bandpass is proportional to the outside limits of the specific range around vehicle 1. Accordingly, a zone model with several ranges around vehicle 1 can implement and detect in a simple way in which zone there is an ID transmitter 3 by setting increasing bandwidths to the predefined values in each case.

On implementation with two bandpass filters according to FIG. 5, the bottom frequency of the left bandpass must be shifted to the left or downward and the top frequency of the right bandpass 10 upward or to the right according to the outside limits within a range in which case the bandpasses 9 and 10 remain either constant or can be changed depending on the preconditions.

The bandwidth of bandpasses 9 and 10 can be used advantageously here for the outer and inner limit of the specific range around the vehicle 1 so that, in the case of an implementation example according to FIG. 5, the noise bandwidth can be reduced and signals can be suppressed in both directions outside the bandpasses 9 and 10.

In addition, it is also feasible that the received signals or the signals resolved in spectral lines are evaluated in respect of an identification known in the receiver, particularly the base station, to possibly distinguish between interference signals and signals from an ID transmitter.

What is claimed is:

1. A method for determining the position of at least one second transmitting and receiving device in respect of a first transmitting and receiving device in a passive access control system operating in the GHz range, comprising the steps of:
   a) using a radar method, particularly an FM-CW radar method, by which signals are received in the first transmitting and receiving device on the left-hand side and right-hand side of a modulation frequency, and
   b) determining the distance of two signals closest to the left-hand side and right-hand side modulation frequency, wherein the distance of the two signals is proportional to the distance between the first transmitting and receiving device and at least the second transmitting and receiving device so that multipath propagations are not taken into consideration.

2. The method according to claim 1, wherein the distance of the signals is determined by means of at least one bandpass filter wherein in a first measurement, starting out with a predefined lowest bandwidth and if signals are not detected within this bandwidth, the distance of the bottom and top limits of at least one bandpass filter is increased by the modulation frequency for the next measurement.

3. The method according to claim 2, wherein each subsequent measurement takes place with a predefined bandwidth in each case.

4. The method according to claim 3, wherein different ranges are assigned to different top and bottom measurements.

5. A first transmitting and receiving device for determining the position of a second transmitting and receiving device, wherein the first transmitting and receiving device comprises a FM-CW radar transmitting and receiving device wherein signals are received on the left-hand side and right-hand side of a modulation frequency, said device determines the distance of two signals lying closest to the left-hand side and right-hand side of the modulation frequency, wherein the distance of the two signals is proportional to the distance between the first transmitting and receiving device and the second transmitting and receiving device so that multipath propagations are not taken into consideration.

6. The transmitting and receiving device according to claim 5, wherein the at least one bandpass filter can be varied to perform consecutive measurements with different increasing bandwidths in each case.

7. The transmitting and receiving device according to claim 5, wherein the transmitting and receiving device has two bandpass filters to detect signals lying on the left-hand side and right-hand side of the modulation frequency, respectively.

8. An arrangement comprising:
   first and second transmitting and receiving devices,
   the first transmitting and receiving device can determine the position of the second transmitting and receiving device,
   the first transmitting and receiving device is a FM-CW radar transmitting and receiving device wherein signals are received on the left-hand side and right-hand side of a modulation frequency, said device includes at least two bandpass filters and determines the distance of two signals lying closest to the left-hand side and right-hand side of the modulation frequency, wherein the distance of the two signals is proportional to the distance between the first and the second transmitting and receiving devices so that multipath propagations are not taken into consideration,
   the first transmitting and receiving device is a base station of a vehicle, and wherein
   the second transmitting and receiving device has an ID transmitter.

9. The arrangement according to claim 8, wherein the second transmitting and receiving device is embodied as a reflector that returns the signals of the first transmitting and receiving device in a modulated way.

10. The arrangement according to claim 8, wherein a bandpass filter can be varied to perform consecutive measurements with different increasing bandwidths in each case.

* * * * *